United States Patent Office 3,397,994
Patented Aug. 20, 1968

3,397,994
IMITATION CREAM CHEESE SPREAD CONTAINING POLYUNSATURATED FAT
Gilbert D. Elenbogen, Skokie, and Morris Baron, Chicago, Ill., assignors to Vitamins, Inc., Chicago, Ill., a corporation of Illinois
No Drawing. Continuation-in-part of application Ser. No. 275,214, Apr. 24, 1963. This application Sept. 16, 1964, Ser. No. 397,037
9 Claims. (Cl. 99—116)

ABSTRACT OF THE DISCLOSURE

A dietary spread resembling cream cheese containing 15 to 40% of fat which is high in polyunsaturation, 5 to 13% phosphoprotein solids, and water. The spread is made by homogenizing the fats, the phosphoprotein, and the water at 160° F. A lactic acid producing culture is added and allowed to incubate until about pH 4.6 is achieved. The mixture is heated to about 165° F., whereupon a vegetable gum is added and the mixture again is homogenized.

---

This is a continuation-in-part of application Ser. No. 275,214, filed Apr. 24, 1963, by Gilbert D. Elenbogen and Morris Baron, now abandoned.

This invention relates to new, edible, cream cheese spreads having an increased ratio of polyunsaturated fats to saturated fats, and methods for preparing the same.

Recently, certain medical investigators have emphasized the need for reducing the blood serum cholesterol level in humans, primarily those persons having heart conditions or most susceptible to such a condition. It has been suggested that there is a correlation between high levels of serum cholesterol and the incidence of atherosclerosis. Further, some reports have indicated that relatively high levels of hydrogenated fats are also a factor in the increase of serum cholesterol.

It is known that polyunsaturated fats, such as those containing linoleic acid, lower the serum cholesterol levels in humans, whereas saturated fats, such as fats more saturated than oleic acid, raise the cholesterol level in humans. Moreover, it is well known that animal fats are generally relatively high in saturated fats, while vegetable oils are generally relatively high in unsaturated fats. Consequently, dairy products (e.g., butter) are primarily composed of saturated fats, whereas margarine producers aware of the cholesterol problem have attempted to increase the ratio of polyunsaturated fats to saturated fats by the replacement of animal fats with vegetable fats. The success of this substitution is evidenced, for example, in U.S. Patent No. 2,955,039, wherein a ratio of approximately 1.5 parts of unsaturated fats to 1 part of saturated fats has been produced. Slightly higher ratios have been reported for other food products; however, these higher ratio products have not had desirable physical characteristics, e.g., being a solid product.

Up to the time of the present invention, no spread was known where the polyunsaturated fat to saturated fat ratio has exceeded much above about 1–2:1. The reason for this is that polyunsaturated fats, e.g., corn oil, are liquid at room temperature and solid products are difficult to obtain using such fats. Therefore, a compromise has been made between the physician and heart disease patient who, on one hand, favor a low cholesterol level product, and manufacturers who, on the other, have found it economically impractical to produce a spread having a high ratio of polyunsaturated fats to saturated fats.

We have been able to solve the problems mentioned above by producing an imitation cream spread whose salient feature is its ratio of polyunsaturated fat to saturated fat which falls in the range of 3:1 to 9:1 with the total fat content in the spread amounting to about 15% by weight to about 40% by weight. Additionally, the taste of the new spread is extremely appealing and pleasing to the average consumer, since no trace of vegetable oil can be observed. Also, contrary to many of the artificial spreads used today, the fats present in our spread have not been chemically or artificially hydrogenated. Hydrogenation has been criticized in certain reports of medical clinicians. Further, we have been able to produce this new spread in a relatively economical manner.

With our imitation cream cheese manufacturers can easily produce a number of commercial "dips" not presently available on the markets, thus providing an additional variety of food not heretofore available for heart disease patients. Moreover, our imitation cheese can be used in making commercial cream cheese cakes and products not previously suitable for heart patients. In our emulsified non-hydrogenated edible spread the ultimate weight of the spread contains about 15–40% total fat by weight and is essentially free of cholesterol with the ratio of polyunsaturated to saturated fats being in a range from about 3:1 to 9:1. Further, the spread contains, based on the ultimate weight of the spread, about 0.1–2.0% by weight of a stabilizing vegetable gum, about 5–13% by weight, preferably about 7–10% by weight, of phosphoprotein solids from the group consisting of casein, alkali caseinate and non-fat milk solids, about 0.5–5% by weight of lactic acid producing culture, with the rest of the ultimate weight substantially comprising water in the range of about 40–70%. The spread resembles cream cheese and is uniformly spreadible having a smooth taste and texture. It is substantially homogeneous at room and refrigerator temperatures and does not separate into phases.

To make the spread, the fat content is thoroughly intermixed with the phosphoprotein solids, the mixing being carried out at about 160° F., after which it is homogenized in a conventional dairy homogenizer in the range of about 1000 to 2500 p.s.i. and preferably about 2500 p.s.i. Lactic acid producing culture is added, after which the composition is incubated in a range of about 65° to 78° F. and advisedly in the range of about 70° to 73° F. for about 14 hours or until an acidity of 0.70 or a pH in the range of 4.4 to 4.8 is reached.

Following incubation, the product is heated in the range of 110° to 140° F. and advisedly 120° F. for about 20 minutes and then unwanted liquids are drained. A control is run on the product and if the fat content is too low, fat can be added or if the fat content is too high, it can be lowered by the addition of water.

The product is then heated to make it fluid and to pasteurize it, the heating being done by raising the temperature to about 145° F. at which point a 30 minute timed pasteurization period is initiated. Continued heating of the product in this period brings the temperature in the range of 160°–175° F. and preferably about 170° F. A gum stabilizer, mold inhibitor preservative, antioxidant, emulsifier, vitamin, or the like can be added during this period.

Following pasteurization, the product is again homogenized at a pressure in the range of about 1000 p.s.i. to 2500 p.s.i and advisedly about 2500 p.s.i. after which the finished product can be placed in containers.

Example I

The preparation of 200 pounds of our cream cheese spread having a total fat content of about 34% can be effected using the following ingredients:

66 pounds corn oil
60 gallons of milk products (skim milk, condensed milk or whole milk) having 2 pounds of butter fat and 10% of the milk products being non fat milk solids
$36 \times 10^6$ units vitamin A (U.S.P.)
$4 \times 10^6$ units vitamin D (U.S.P.)
11,000 mg. tocopheral, vitamin E
1 gallon lactic acid producing starter culture (*Streptococcus lactis*)
45 grams mono and diglyceride emulsifier
45 grams locust bean gum
9 grams NDGA (i.e. nordihydrognaiaretic acid)
16 oz. sorbic acid
24 oz. salt
5 cc. diacetyl (i.e. dimethyl ketone)
.75 cc. rennet In the manufature of the spread a solution containing 60 gallons of milk products is prepared so that 2.0 pounds of butter fat and 10% non fat milk solids are present. The corn oil and vitamins A, D and E are added with the mixture being stirred and heated to about 160° F. where it is homogenized in a conventional dairy homogenizer at preferably 2500 p.s.i. although the homogenization can be accomplished in the range of 1000 to 2500 p.s.i. Subsequently, the lactic acid producing culture is added along with about .75 cc. rennet, the rennet being optional, serving to facilitate coagulation. The composition is then incubated at about 72° F. for about 14 hours or until acidity is 0.70 or pH is 4.6. Following incubation the composition is heated in the range of 110° to 140° F., and preferably 120° F., for about 20 minutes to destroy the culture after which the composition is placed in cheese bags and allowed to drain unwanted liquids, i.e. whey.

A control is run on the product at this stage of the process to ascertain if the proper fat content is present at which time fat can be added to the product if necessary or the fat content lowered by addition of water.

The product, which is in a semi-solid state, is then heated to place it in a fluid condition and to pasteurize it, this being accomplished by heating the product to about 145° F. at which point a 30 minute pasteurization period is measured. Continued heating of the product brings the temperature in the range of about 160–175° F., preferably 170° F. During this time period the locust bean gum, NDGA, salt, sorbic acid, diacetyl and emulsifier can be added. At the end of the pasteurization period, the composition is again homogenized in a dairy homogenizer at a pressure in the range of about 1000 to 2500 p.s.i. and preferably 2500 p.s.i. The finished product can then be placed in appropriate containers by conventional container-filling equipment.

Example II

In preparing 200 pounds of our spread having a total fat content of 20%, the following ingredients can be utilized:
39 pounds corn oil
60 gallons of milk products (skim milk, condensed milk or whole milk) having one pound of butter fat and 10% of the milk products being non fat milk solids
$36 \times 10^6$ units vitamin A (U.S.P.)
$4 \times 10^6$ units vitamin D (U.S.P.)
11,000 mg. tocopheral, vitamin E
1 gallon lactic acid producing starter culture
45 grams mono and diglyceride emulsifier
45 grams locust bean gum
9 grams NDGA (i.e. nordihydrognaiaretic acid)
16 oz. sorbic acid
24 oz. salt
5 cc. diacetyl (i.e. dimethyl ketone)
.75 cc. rennet The procedure for manufacturing this spread having a 20% total fat content is the same as that utilized in making the product disclosed in Example I.

Example III

The ingredients and procedure for manufacturing the spread are the same as employed in the above examples with the exception that the 60 gallons of milk products will be replaced with a 60 gallon aqueous mixture with about 5% of the mixture being either casein or alkali caseinate.

Further, in this example, when a product having a total fat content of 34% is desired, 68 pounds of corn oil can be added or, if desired, 66 pounds of corn oil can be added with 2 pounds of butter fat being mixed into the product at the time the mold inhibitor preservatives, gum, antioxidant and the like are added. Similarly, if a product having a 20% total fat content is desired, then 40 pounds of corn oil can be added, or, if desired, 39 pounds of corn oil can be added and 1 pound of butter fat can be added along with the gum, preservatives, antioxidants and the like.

It is understood that while corn oil was used in the above examples, sesame oil, cottonseed oil, safflower or wheat germ oil, or various combinations thereof, could equally be used, depending only upon the degree of fat and unsaturation, stability and flavor desired. For example, in the above compositions, a different flavoring could be provided by the substitution of about 1.36 pounds of butter fat and about 66.6 pounds of a suitable vegetable oil for the 68 pounds of corn oil. For increased smoothness of the spread, the corn oil content could be varied using about 66.6 pounds of corn oil and about 1.36 pounds of coconut oil.

Moreover, the stabilizing vegetable gum set forth above can be replaced with gum arabic, gum tragacanth, guar gum or any other suitable gum stabilizer or mixtures thereof.

If desired, when highly unsaturated oils are used, e.g., safflower oil, an antioxidant such as BHA, i.e., butylated hydroxyanisole, or BHT, i.e., butylated hydroxytoluene, but preferably NDGA is used in amounts of about .01% by weight of the oil or such amount as is needed to preserve the product against oxidation.

Additionally, aside from the vitamins indicated in the examples other suitable vitamins can be added.

Gelatin may be added to secure certain desired consistencies.

Coloring of the spread can be accomplished by the addition of an atto-tumeric blend or carotene.

Finally, other mold inhibitor preservatives such as sodium benzoate or sodium propionate in amounts of about 0.1% of the ultimate weight can be used, if desired, instead of sorbic acid.

In the above examples, the pH value of 4.6 was indicated as a preferable value. The pH value is advisably anywhere within the range of about 4.4 to 4.8.

For large commercial batches of spread, the water could be drained by means of a conventional clarifier as opposed to cheese bags.

The preferable range specified in the above examples for incubation is 70° to 73° F., however an operative range of 65° to 78° F. could be employed.

The results of the compositions set forth above have been to provide an emulsified non-hydrogenated edible spread resembling cream cheese that is uniformly spreadable, has a smooth texture and taste and is substantially homogeneous at room and refrigerator temperatures. Additionally, the spread will not separate into phases and is essentially free of cholesterol, while having a fat content ratio of polyunsaturated to saturated fats of about 3:1 to 9:1.

The foregoing detailed description has been given for clearness of understanding only, and no unnecessary limitations should be understood therefrom, as modifications will be obvious to those skilled in the art.

What is claimed is:

1. An emulsified non-hydrogenated edible spread resembling cream cheese that is uniformly spreadable, has a smooth texture and taste and is substantially homogeneous at room and refrigerator temperatures, does not separate into phases, is essentially free of cholesterol and has a fat content having a ratio of polyunsaturated fats to saturated fats of about 3:1 to 9:1 parts by weight, the ultimate weight of said spread containing about 15–40% total fat by weight, about 0.1 to 2.0% by weight of a stabilizing vegetable gum, about 5–13% by weight of phosphoprotein solids from the group consisting of casein, alkali caseinate and non-fat milk solids, a small amount of a heat inactivated lactic acid producing culture, and substantially 40–70% water.

2. A spread in accordance with claim 1 having a preservative.

3. A spread in accordance with claim 1 having an antioxidant.

4. A spread in accordance with claim 1 wherein said total fat content is 20%.

5. A spread in accordance with claim 1 wherein said total fat content is 34%.

6. A spread in accordance with claim 1 wherein said amount of heat inactivated lactic acid producing culture being from about 0.5% to about 5.0% by weight.

7. A method of preparing an emulsified product resembling cream cheese, that is uniformly spreadible, has a smooth texture and is substantially homogeneous at both room and refrigerator temperatures, which does not separate into phases, and which has only a trace of cholesterol, said cream cheese containing from about 15 to about 40 percent by weight of fats, said fats having a ratio of polyunsaturated fats to saturated fats of between about 3:1 to 9:1, said method including the steps of:

forming a mixture, at a temperature of about 160° F., of said fat, about 5 to about 13 percent by weight of phosphoprotein solids from the group consisting of casein, alkali caseinate and non-fat milk solids, and from about 40 to about 70 percent water;

homogenizing said mixture at a pressure in the range of from about 1000 to about 2500 p.s.i.;

adding a small amount of lactic acid-producing culture to said mixture;

incubating said mixture until a pH of about 4.4 to about 4.8 is achieved;

heating said incubated mixture to a temperature between about 160 and 175° F.;

adding between about 0.1 to about 2.0 percent by weight of stabilizing vegetable gum; and homogenizing said mixture containing gum at a pressure in the range of about 1000 to about 2500 p.s.i.

8. The method as described in claim 7, which includes the step of heating said mixture to from about 110° F. to about 140° F. for about 20 minutes after the pH of about 4.4 to 4.8 is achieved, in order to inactivate the lactic acid-producing culture.

9. The method as described in claim 7, which includes the step of pasteurizing said mixture by raising the temperature to about 145° F. for about 30 minutes, after the step of inactivating the lactic acid-producing culture.

References Cited

UNITED STATES PATENTS

| | | | |
|---|---|---|---|
| 1,403,405 | 1/1922 | Habbema | 99—63 |
| 1,676,138 | 7/1928 | Epstein | 99—63 |
| 2,892,721 | 6/1959 | Nelson | 99—115 X |
| 3,003,882 | 10/1961 | Peat | 99—136 |
| 3,025,165 | 3/1962 | Metzger | 99—59 |
| 3,189,464 | 6/1965 | Heinemann | 99—116 |
| 3,278,313 | 10/1966 | Rhodes | 99—116 |
| 3,232,768 | 2/1966 | Van Wieren et al. | 99—162 |
| 3,310,406 | 3/1967 | Webster | 99—117 X |

OTHER REFERENCES

Jacobs, M. B.: The Chemical Analysis of Foods and Food Products, 3rd ed., 1958, Van Nostrand Co., N.Y., pages 323–324.

Whittier, E. O., et al.: Byproducts From Milk, Reinhold Publishing Corp., N.Y., 1959, pages 136–138.

Sanders, G. P.: Cheese Varieties and Descriptions, U.S. Department of Agriculture, Agr. Hand Book N. 54, December 1953, pages 34 to 36.

Manual For Dairy Manufacturing Short Courses, Dairy Manufacturing Division, Pennsylvania State University. Kurtz Bros., Clearfield, Pa., 1956 (pages 81–83).

ALVIN E. TANENHOLTZ, *Primary Examiner.*

D. NAFF, *Assistant Examiner.*